(12) United States Patent
Larkin

(10) Patent No.: US 8,151,820 B1
(45) Date of Patent: Apr. 10, 2012

(54) MODULAR MULTIPURPOSE PATIENT CONNECT HUB

(76) Inventor: Kevin B. Larkin, Pebble Beach, CA (US)

( * ) Notice: Subject to any disclaimer, the term of this patent is extended or adjusted under 35 U.S.C. 154(b) by 983 days.

(21) Appl. No.: 12/125,145

(22) Filed: May 22, 2008

(51) Int. Cl.
 *B65H 75/34* (2006.01)

(52) U.S. Cl. .................................. 137/355.26; 242/399

(58) Field of Classification Search ............. 137/355.26, 137/355.17, 355.16, 355.2, 355.23; 242/378.4, 242/379, 388.7, 399, 389, 390, 611, 611.1; 439/501, 504
See application file for complete search history.

(56) References Cited

U.S. PATENT DOCUMENTS

| | | | | |
|---|---|---|---|---|
| 3,821,496 | A * | 6/1974 | Malone | 191/12.2 R |
| 4,114,273 | A * | 9/1978 | McGaha | 433/27 |
| 6,065,490 | A * | 5/2000 | Falcone, Jr. | 137/355.23 |
| 6,077,108 | A * | 6/2000 | Lorscheider et al. | 439/501 |
| 6,588,444 | B2 * | 7/2003 | Paplow et al. | 137/15.01 |
| 7,216,655 | B2 * | 5/2007 | Halbmaier et al. | 134/170 |
| 7,335,053 | B2 * | 2/2008 | Avevor et al. | 439/502 |
| 7,901,241 | B1 * | 3/2011 | Larkin | 439/501 |
| 2006/0286861 | A1 * | 12/2006 | Avevor et al. | 439/501 |
| 2007/0119999 | A1 * | 5/2007 | Liao | 242/378.4 |

* cited by examiner

*Primary Examiner* — John Rivell
*Assistant Examiner* — R. K. Arundale
(74) *Attorney, Agent, or Firm* — Morgan, Lewis & Bockius LLP

(57) ABSTRACT

A fluid supply cartridge, reeling cartridge and/or wireless cartridge may be freely combined, stacked and removable snap arrested in an overall housing that may be attached in proximity to a bedded patient. The fluid supply cartridge hygienically protects a replaceable fluid bag and spooled fluid supply hose. Wires and/or cables and/or hoses may be conveniently pulled out of the cartridges and connected to the patient. Once used, contaminated and reeled back, the wires and/or cables and/or hoses may be on-spool cleaned and the cartridges sealed for storage and reuse.

18 Claims, 11 Drawing Sheets

MODULAR MULTIPURPOSE PATIENT CONNECT HUB

FIELD OF INVENTION

The present invention relates to patient connect hubs. Particularly, the present invention relates to patient connect hubs for interchangeably and modularly providing a variety of patient connect cartridges.

BACKGROUND OF INVENTION

Patients subjected to stationary medical treatment or monitoring are commonly connected to a varying number of well known monitoring and/or supply systems. Dependent on the nature of the treatment and/or monitoring and the technology employed, electrical wires or cables, wireless signals, supply hoses and/or vacuum hoses may be connected to the patient. With increasing number of wires, cables and hoses, efficient and fast connecting and disconnecting of a patient becomes increasingly cumbersome and time consuming. Free hanging wires, cables and/or hoses may likely entangle with each other. Moreover, during transport or transfer of a bedded patient for example in an ambulance or rescue helicopter, wires, cables and hoses of excessive length may bounce around. Therefore, there exists a need for a system that provides for extendable and automatically retracting patient connect cables, wires and/or hoses. The present invention addresses this need.

Medical patients commonly require a specific combination of fluid supplies via hoses and/or monitoring via wires, cables, hoses or via wireless transducers connected to the patient as is well known in the art. This is commonly accomplished by a number of different devices and fixtures placed adjacent the patient bed, which may impair direct access to the patient. Therefore, there exists a need for a patient connect hub that may be centrally accessed by different monitoring devices and that may be modularly configured with varying cartridges for supplying and/or monitoring a patient via wires, cables, hoses and/or wireless transducers. The present invention addresses also this need.

After each use, patient connect cables and hoses need to be cleaned and sterilized. This is commonly done in a manual fashion, which is time consuming. Attempts to automatically wipe and sterilize wires while retracted in a motored fashion bears the risk of uncontrollable contamination and clogging of housed and hidden components inside the housing into which the respective cable or wire is retracted. Therefore, there exists a need for reliable accessing, as well as cleaning and sterilizing of spooled patient connect wires, cables and hoses. The present invention addresses also this need.

Patient supply fluids such as blood are commonly packaged in elastic bags monolithically combined with a hose via which the fluid is transported to the patient. The fluids are filled into that bag via the hose under stringent hygiene condition. Nevertheless, during storage, transportation and usage, these bags may be exposed to direct light, temperature, unhygienic environments and mechanical impact. Therefore, there exists a need for a fluid supply cartridge that provides shielding against sunlight, temperature variations, unhygienic environments and mechanical impact. The present invention addresses also this need.

Wireless patient data collection becomes increasingly attractive. Unfortunately, common existing patient connect systems are configured for wire and cable based patient access. Since replacing entire monitoring systems may be cost intensive, there exists a need for a bridging interface between cable and wire based patient connect devices and wireless patient data collecting subsystems. The present invention addresses also this need.

SUMMARY

Components of the modular multipurpose patient connect hub include an overall housing into which a number of patient connect cartridges in varying configurations may be releasable snapped in and stacked at multiple stacking guides inside the overall housing. The patient connect cartridges may be configured in single stacking width or multiple stacking widths depending on their respective function. One configuration of the patient connect cartridge is that of a fluid supply cartridge, which may be preferably in a multiple stacking width to house a certain amount of patient supply fluid such as blood. Inside the fluid supply cartridge is a fluid filled bag and hose rotationally held in a spin housing. The spin housing has bag cup and below with respect to an assembly orientation of the fluid supply cartridge a hose spool. That way, fluid may pass through the hose that may be pulled out and spooled off to the required length. A hose insertion slit extends laterally across the bag cup down to the hose spool such that a previously filled bag and hose may be conveniently placed inside the spin housing and the hose spooled on the hose spool before the loaded spin housing is placed inside the cartridge housing. A peripheral hose end may stick out the cartridge housing and may be contained in a hose end storage cavity that may be sealed with a removable tape. Once the fluid is depleted, a ratchet may be released and a coil spring may rotate the spin housing and the hose reeled in again. The emptied fluid supply cartridge may be fast replaced by a new one that may be secured again by merely snapping it in. In that way and even under sever operational conditions such as inside an ambulance or rescue helicopter, live extending supply of fluids may be provided in a reliable fashion. In addition, the cartridge housing protects and shields the fluid bag and hose during storage, transport and use especially under severe field operation conditions.

Another configuration of the patient connect cartridge is that of a wire, cable or hose based reeling cartridge, which may be as narrow as a single stacking width and may house a wire, cable or hose spool, a retraction spring and a releasable ratchet. The reeling cartridge may feature a connector corresponding to a well known connector standard of a conventional patient connect system. After snapping in the reeling cartridge into the overall housing, the patient connect system may be connected directly to the cartridge and the cable, wire or hose spooled inside the reeling cartridge may be pulled out to the desired length. After use, an internal ratchet may be released and the cable, wire or hose may be reeled in again by a coil spring. The reel cartridge may be configured such that the reeled in cable, wire or hose may be conveniently cleaned once the reeling cartridge is taken out of the overall housing.

Also a configuration of the patient connect cartridge may be that of a wireless bridging cartridge, which may also be as narrow as a single stacking width and may house a wireless transducer to communicate with a corresponding wireless patient data collecting device attached to the patient. The stacking guides may be loaded with any desired combination of fluid supply cartridges, reeling cartridges and/or wireless bridging cartridges. As a favorable result, the patient connect hub may be easily configured for a patient's individual needs of supply and monitoring.

DETAILED DESCRIPTION

Figure 1:
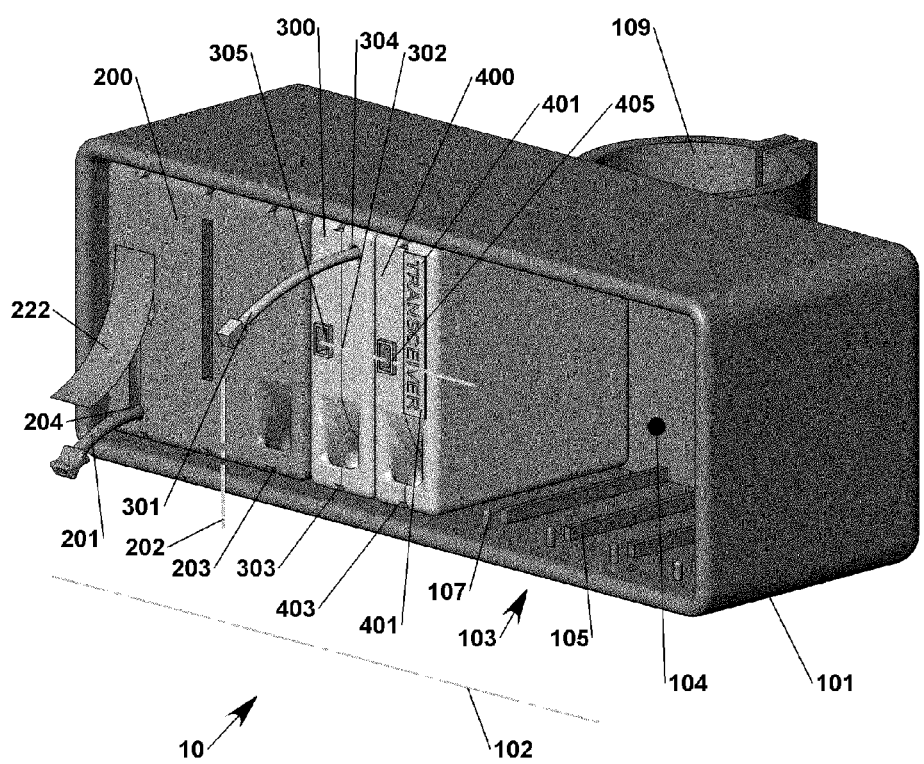
FIG. 1 is a first perspective view of a representative patient connect hub.

Referring to FIG. 1, a representative patient connect hub 10 includes an overall housing 101 and a number of patient connect cartridges 200, 300, 400. The overall housing 101 has a frontal opening 103, a cartridge receive cavity 104 extending from the frontal opening 103, a number of cartridge positioning guides 105 at the cartridge receive cavity 104, a number of releasable cartridge positioning locks 107 and a well known mounting bracket 109. The cartridge positioning guides 105 are preferably positioned inside the cartridge receive cavity 104 such that the patient connect cartridges 200, 300, 400 are guided when entering the cartridge receive cavity 104. In that way, the patient connect cartridges 200, 300, 400 may be tightly stacked in stacking direction 102 without impairing each other during their selective removal, replacement or insertion. The releasable cartridge positioning locks 107 may be configured as spring loaded elements such as pins that extend into the cartridge receive cavity 104 and that may be simultaneously actuated while handling a respective patient connect cartridge 200, 300, 400. In that way, insertion, snap arresting, snap releasing and removal is accomplished preferably by a single hand operation in a most efficient, easy and fast fashion.

Referring to FIGS. 2, 3, 4, 7, 9, 10, 11, the patient connect cartridges 200, 300, 400 may feature respective cartridge housings 221, 223, 321, 323, 421, 423 that correspond to the cartridge receive cavity 104, to the releasable cartridge positioning locks 107 and to the cartridge positioning guides 105 such that the patient connect cartridges 200, 300, 400 are capable of being inserted in the cartridge receive cavity 104 via the frontal opening, positioned inside the cartridge receive cavity 104 via a respective cartridge positioning guide 105 and releasable locked inside the cartridge receive cavity 104 via a respective cartridge positioning lock 107. The cartridge housings 221, 223, 321, 323, 421, 423 have respective mating guides 203, 303, 403 that provide the guiding interaction with the cartridge positioning guides 105. The cartridge housings 221, 223, 321, 323, 421, 423 may also have recessed handling cavities 211, 311, 411 to provide positively locking manual grip to the inserted patient connect cartridges 200, 300, 400. At the same time, the outside shapes of the cartridge housings 221, 223, 321, 323, 421, 423 remain flush for tight mass storage.

Also part of the cartridge housings 221, 223, 321, 323, 421, 423 may be snap openings 213 that extend into the respective recessed handling cavities 211, 311, 411. In that way, the snap openings 213 provide the snapping interaction with the releasable cartridge positioning locks 107 preferably configured as spring loaded pins. In assembled snapped in position, the spring loaded pins 107 extend through the snap openings 213 into respective recessed handling cavities 211, 311, 411. In that way, the snap fix may be easily released by depressing the spring loaded pins 107 while reaching into the recessed handling cavities 211, 311, 411. Once a spring loaded pin 107 is depressed, the respective patient connect cartridge 200, 300, 400 may be conveniently removed.

Figure 3:
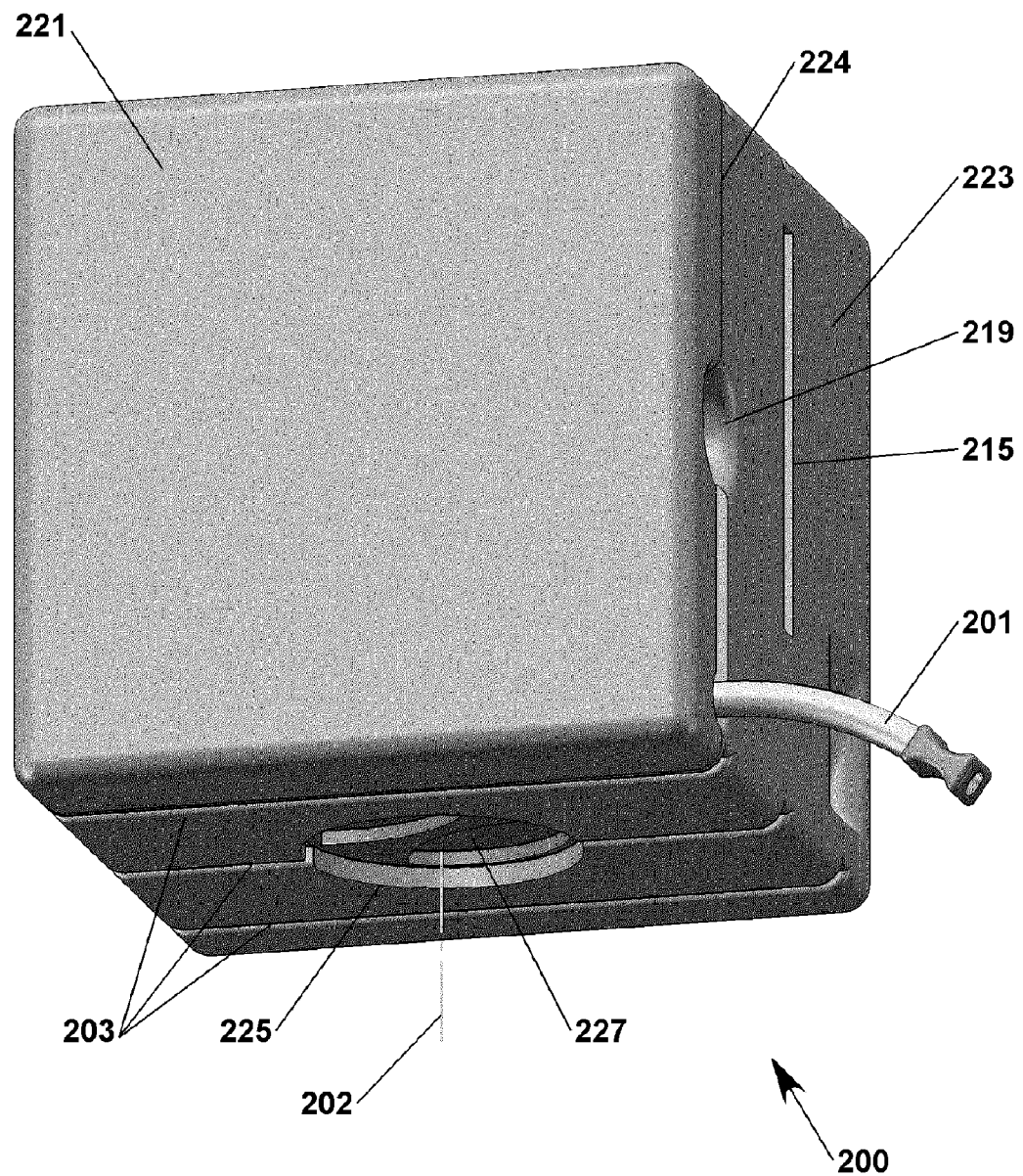
FIG. 3 is a third perspective view the fluid supply cartridge of FIG. 2.
Figure 4:
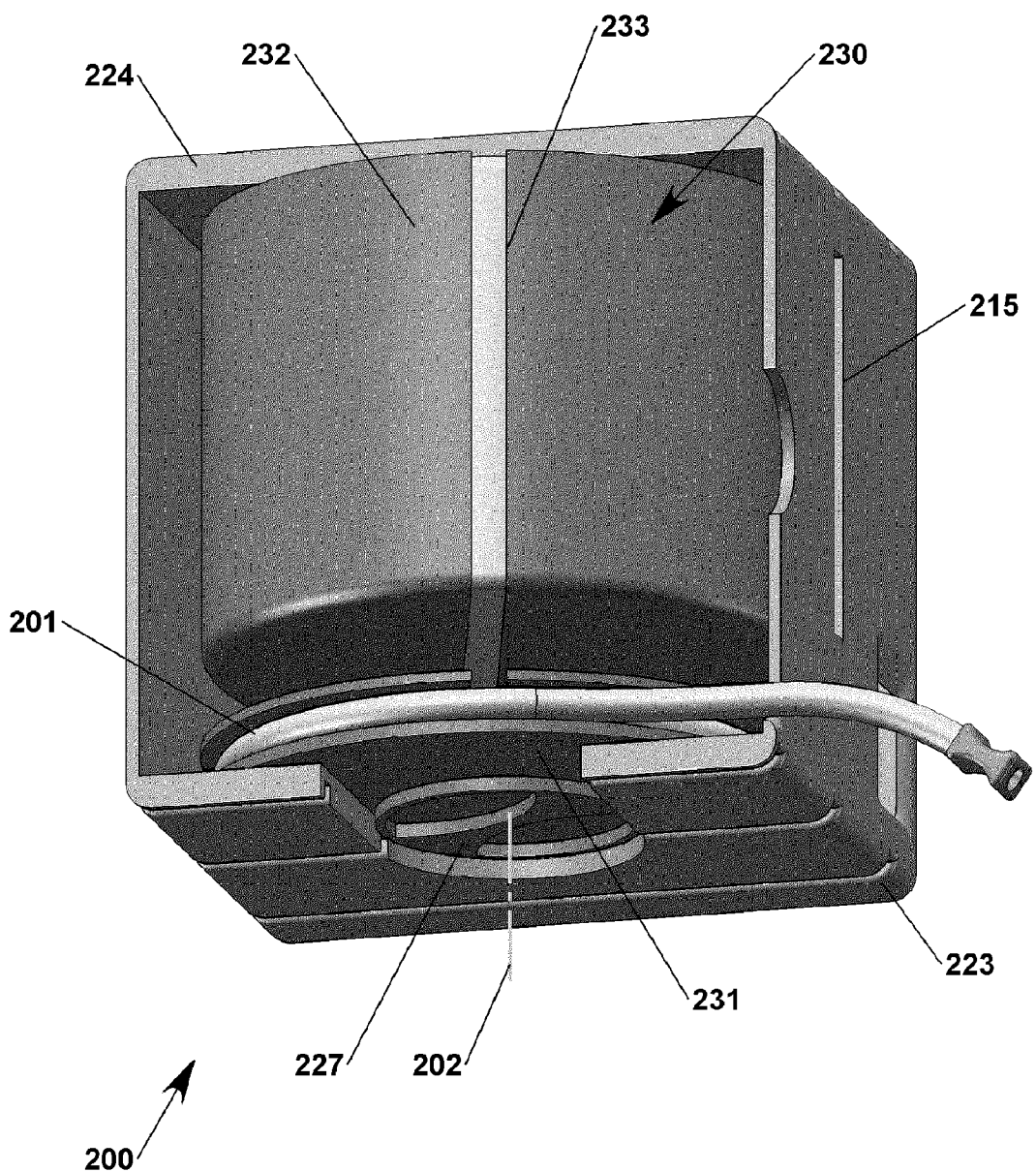
FIG. 4 is the third perspective view of the fluid supply cartridge of FIG. 3 with a housing portion removed.
Figure 5:
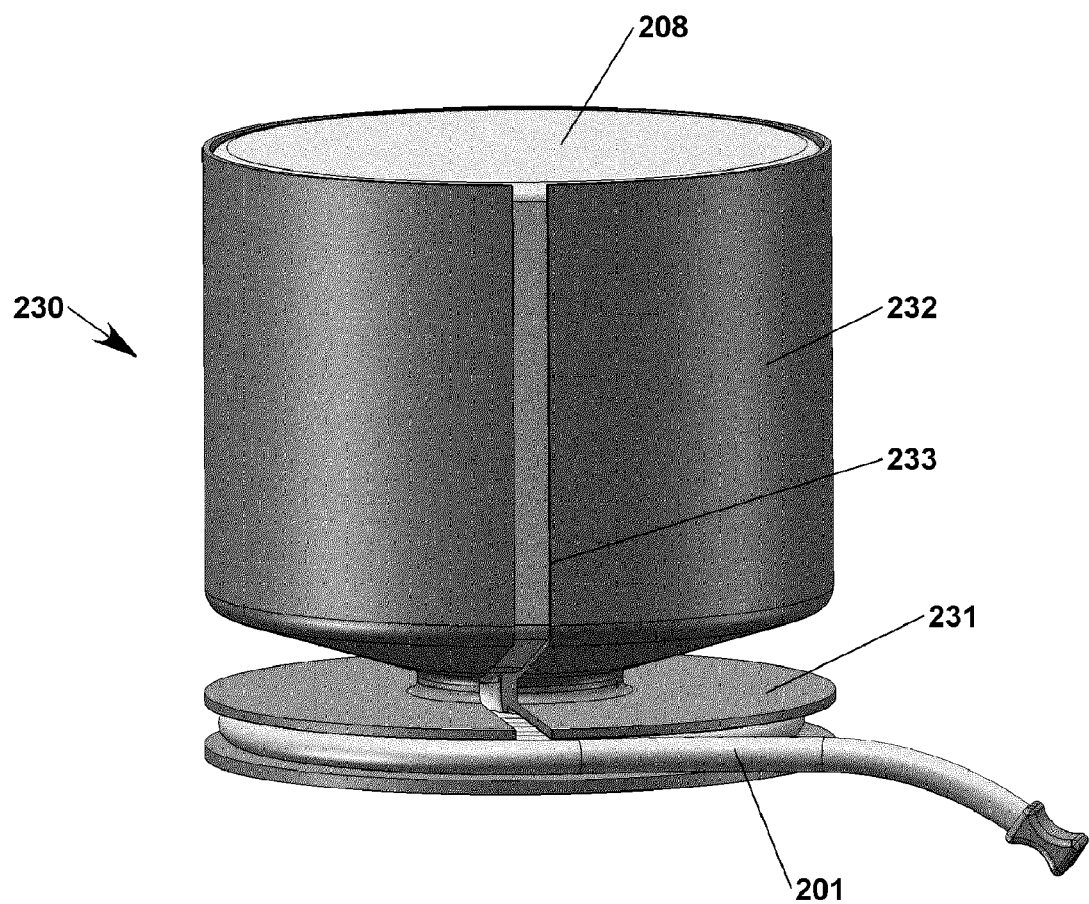
FIG. 5 is a fourth perspective view of the fluid supply cartridge of FIG. 4 without housing.
Figure 6:
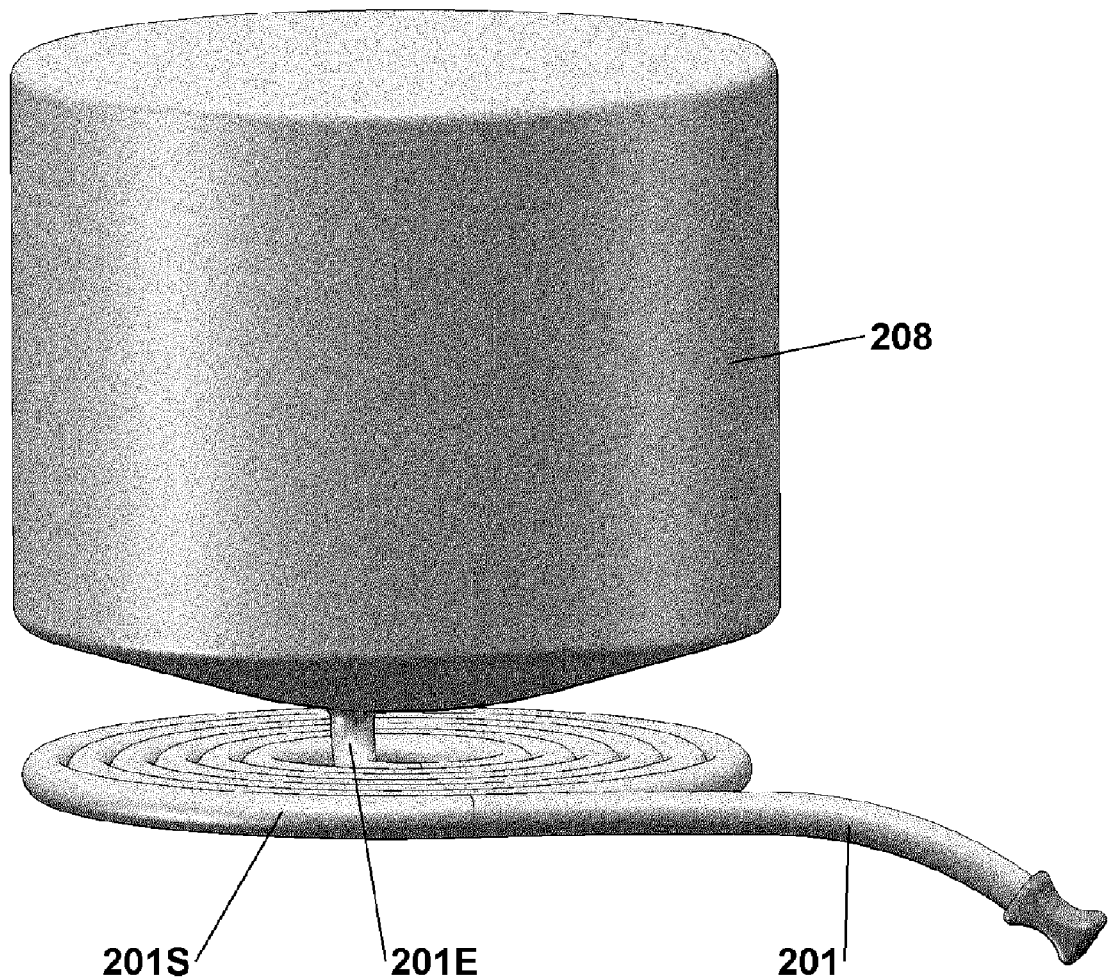
FIG. 6 is the fourth perspective view of the fluid supply cartridge of FIG. 5 without spin housing.

The patient connect cartridge 200 may be configured as a fluid supply cartridge to provide fluid to a patient via an internal liquid container 208 and a spooled supply hose 201. The patient connect cartridge 300 is configured as reeling cartridge to provide spooled wire, cable or hose to be pulled out to desired length and connected to the patient. The patient connect cartridges 200, 300, may also feature an internal reel unit 227, 341, 343, 347 for cartridge internally spooling the patient connect wire or cable or hose 301 and fluid supply hose 201. In FIGS. 3, 4 the internal reel unit 227 is schematically depicted. Well known internal components such as a ratchet wheel 341, a coil spring 343 and a releasing mechanism 347 may be part of the internal reel unit 227 as may be well appreciated by anyone skilled in the art. The internal reel unit 227 may be peripherally accessible through an opening 225 in the housing 221, 223. In that way the fluid supply hose 301 may be manually reeled in.

The cartridge positioning guides 105 and releasable cartridge positioning locks 107 are arrayed along a stacking direction 102 of the cartridge receive cavity 104. The stacking direction 102 may be parallel to a first spool axis 302 of the reeling cartridge 300. A second spool axis 202 of the fluid supply cartridge 200 may be substantially vertical while assembled inside the overall housing 101 such that a liquid may flow through a spooled portion 201S of the fluid supply hose 201 substantially horizontal. In that way, flow reduction due to trapped air bubbles may be avoided. A liquid container 208 in the preferred configuration of a well known soft bag may be positioned above the spooled fluid supply hose portion 201S. In the preferred case of the liquid container 208 being structurally continuously extending from the spool end 201E of the fluid supply hose 201, the liquid container 208 may be contained rotationally free with respect to the second spool axis 202. The liquid container 208 and the fluid supply hose 201 may be contained within a spin housing 230 that is held rotationally free with respect to the second spool axis 202 with the cartridge housing 221, 223. The spin housing 230 features a first spool portion 231 for spooling the fluid supply hose 201, a cup 232 for containing the liquid container 208 and a radial hose assembly slot 233. The radial hose assembly slot 233 extends axially along the circumference of the cup 232 and a top of the first spool 231 such that the fluid supply hose 201 may be assembled through the radial assembly slot 233 in the first spool 231 while the structurally connected liquid container 208 is assembled in the cup 232. A frontal view access 215 may provide visual verification of the fluid level inside the liquid container 208. For that purpose, the spin housing 230 may be of transparent material.

Figure 2:
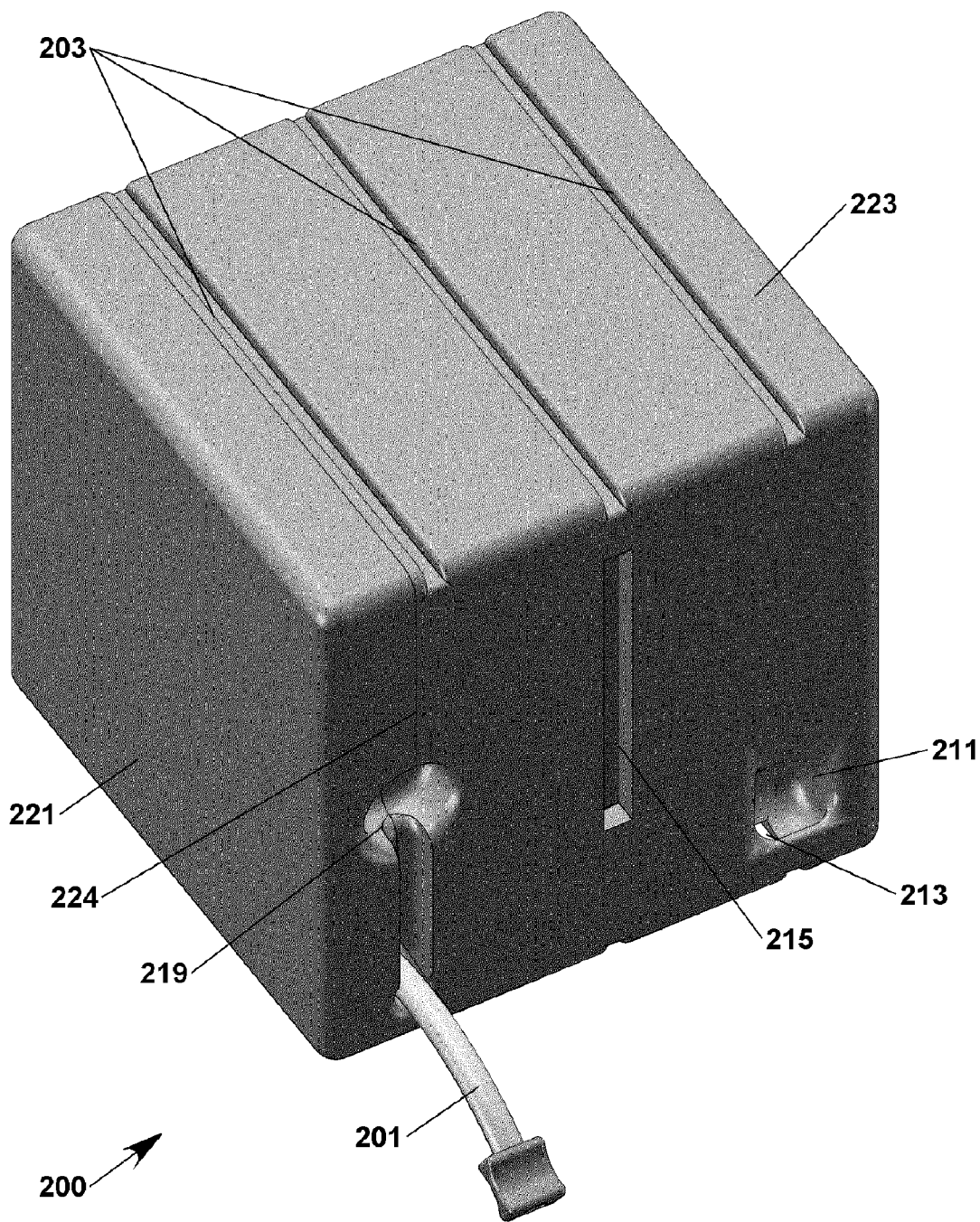
FIG. 2 is a second perspective view of a fluid supply cartridge of FIG. 1 without sealing tape.
Figure 7:
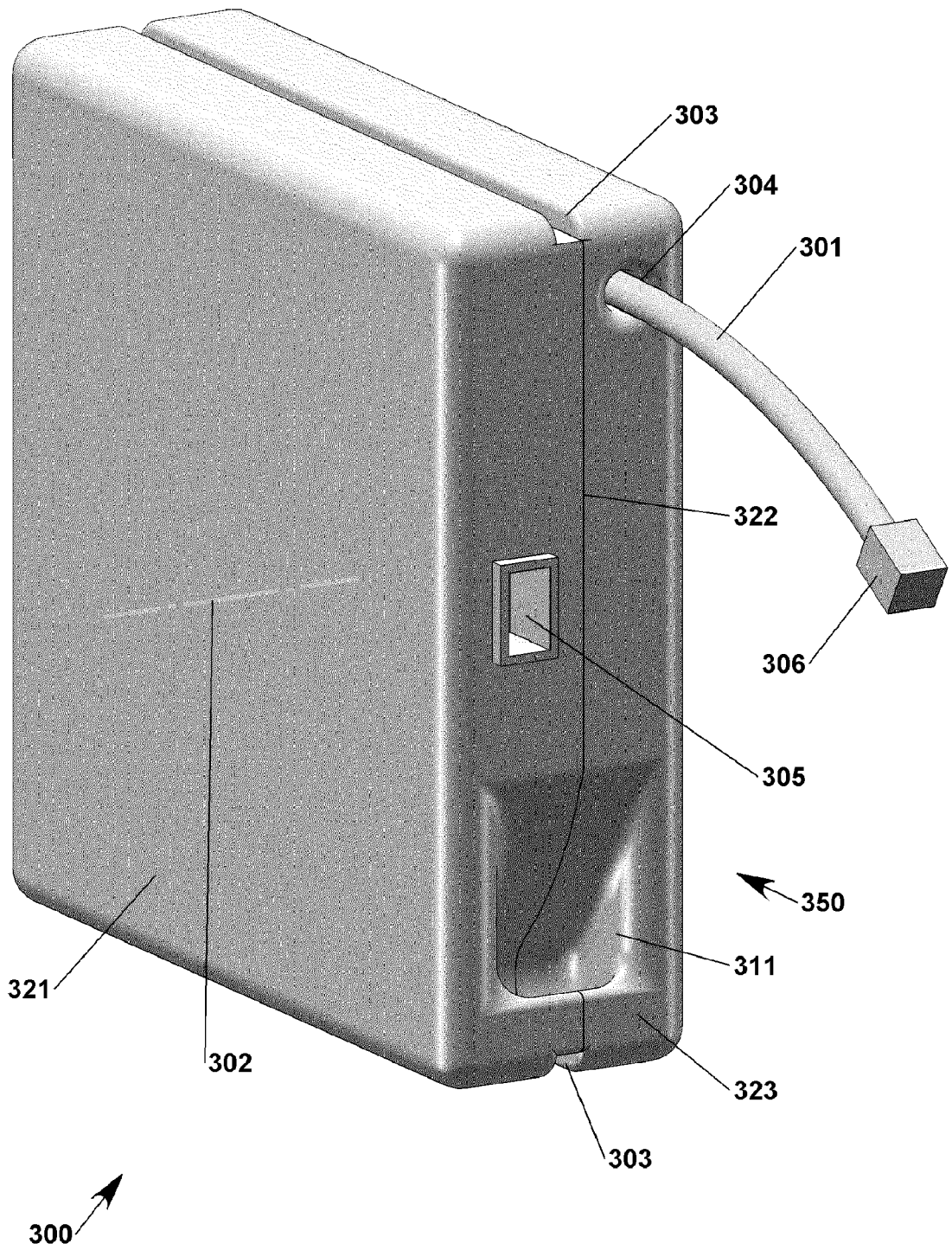
FIG. 7 is a fifth perspective view of a reeling cartridge of FIG. 1.
Figure 8:
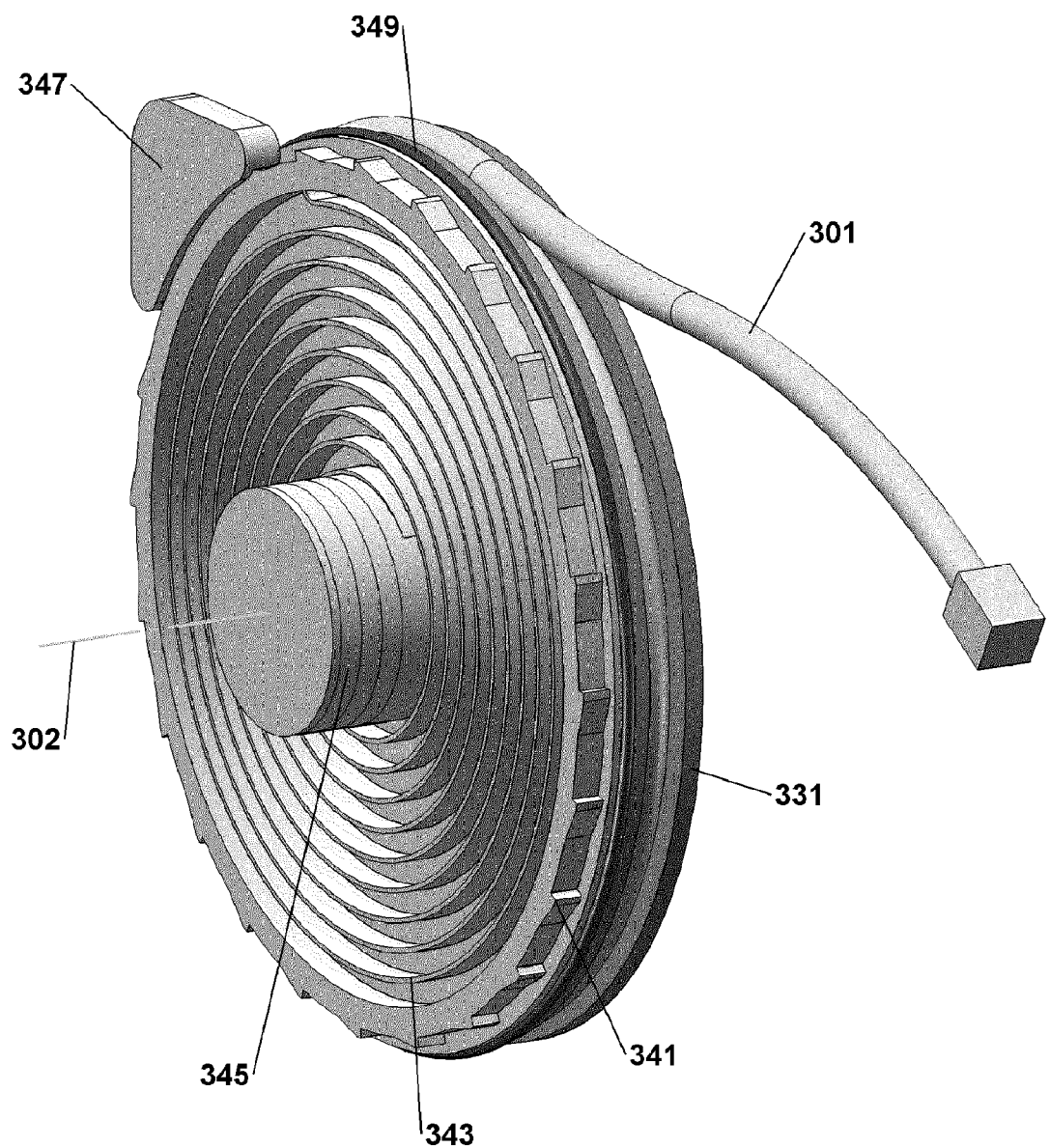
FIG. 8 is the fifth perspective view of the reeling cartridge of FIG. 7 without housing.
Figure 9:
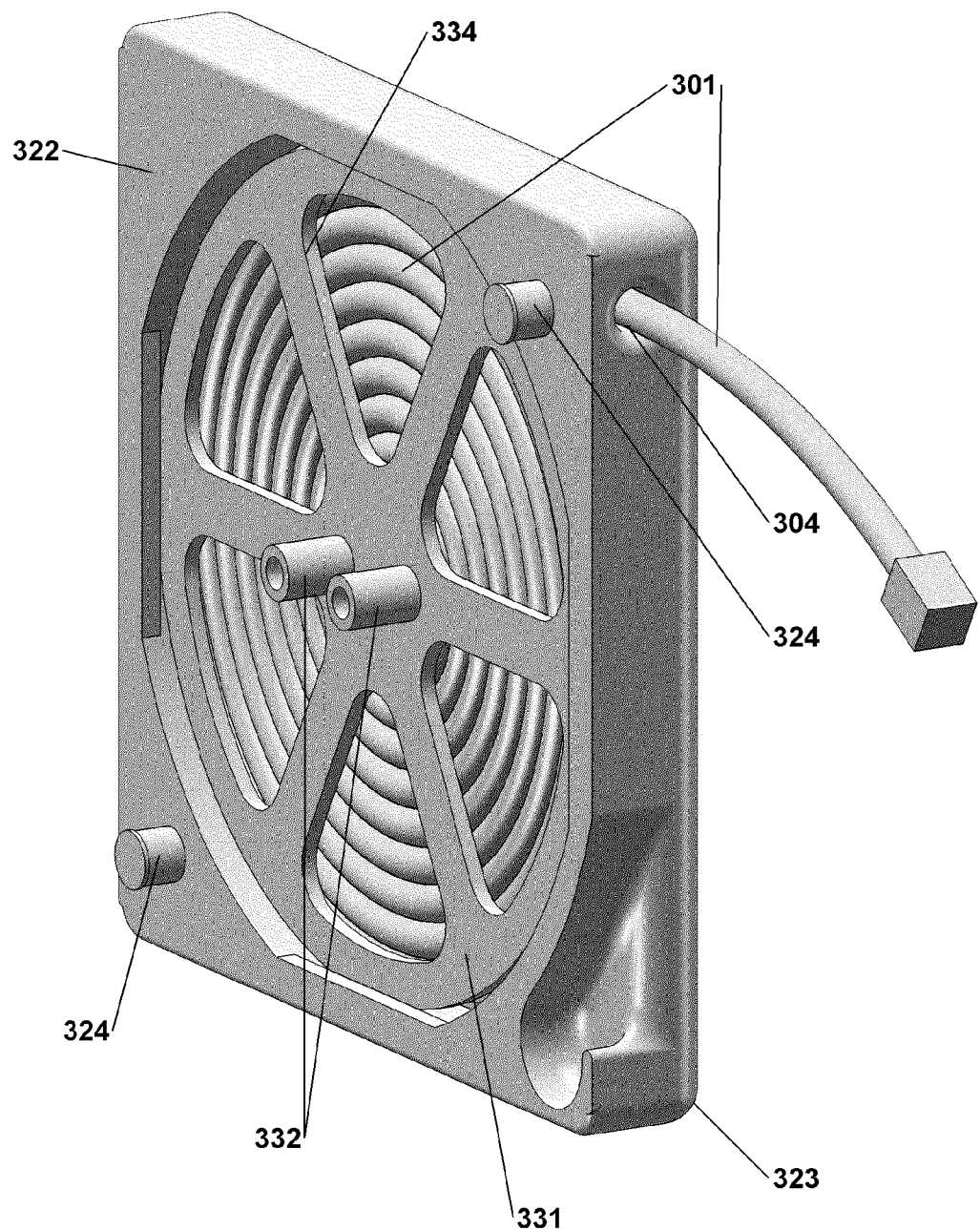
FIG. 9 is the fifth perspective view of the reeling cartridge of FIG. 7 without a housing portion and without a reeling mechanism.
Figure 10:
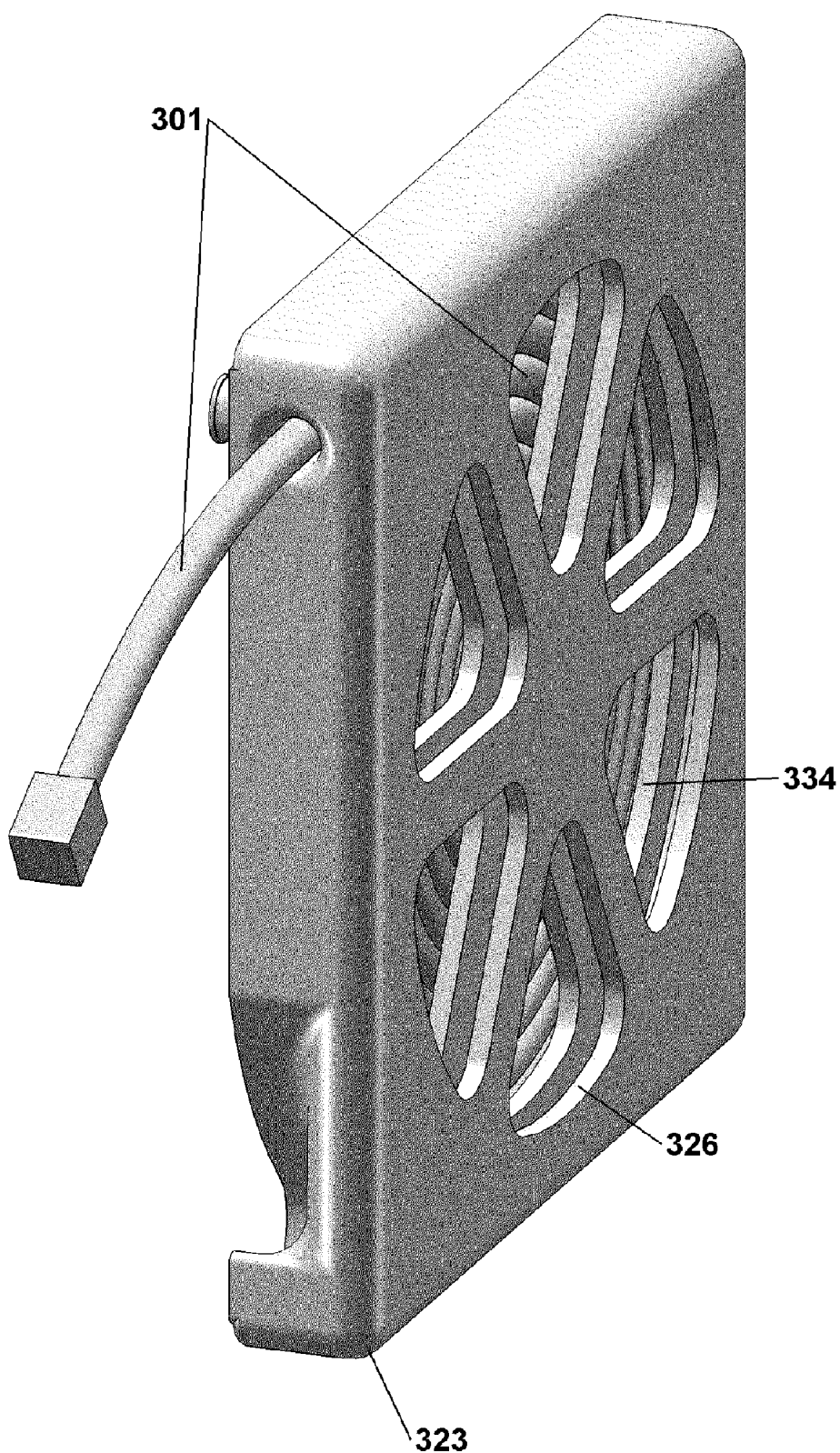
FIG. 10 is a sixth perspective view of the reeling cartridge of FIG. 9.

Also referring to FIGS. 7, 9, the fluid supply cartridges 200, 300 may feature respective through holes 204, 304 through which supply hose 201 and respectively monitoring cable, wire or hose 301 extend. Preferably and as depicted in FIGS. 1-3, the fluid supply cartridge 200 may also feature a hose end storage cavity 219 that is laterally extending from the through hole 204 for storing the peripheral end of the fluid supply hose 201 outside of and recessed into the cartridge housing 221, 223. A sealing tape 222 may be employed to seal the hose end cavity 219 while the peripheral end of the fluid supply hose 201 is contained in the hose end storage cavity 219. The sealing tape 222 may be pulled off to access the peripheral end of the fluid supply hose 201. In that way, maximum hygienic protection is provided the fluid supply hose 201 until immediately prior its use.

The cartridge housing 221, 223 may feature a removable lid 221 that fits together with the cartridge housing remainder 223 along a parting interface 224 that extends across the through hole 204 such that the liquid container 208 and the fluid supply hose 201 may be inserted into the cartridge housing 221, 223 preferably together with the spin housing 230 while the removable lid 221 is removed. In that way, the peripheral end of the fluid supply hose 201 may remain outside the cartridge housing 221, 223 while the removable lid 221 is closed. Irrespective what is shown in FIG. 1, the sealing tape 222 may extend along the parting interface 224 and seal the parting interface 224 as may be clear to anyone skilled in the art. The sealing tape 222 may be at the same time employed to hold the removable lid 221 together with cartridge housing remainder 223. Hence, reinserting a full liquid container 208 may be accomplished by merely fully removing the sealing tape 222. The reel unit 227 may be integrated in the spin housing 230 as may be well appreciated by anyone skilled in the art. Correspondingly, the parting interface 224 may be configured in conjunction with the reel unit 227 such that at least one of the combined housing portions 221, 223 may receive well known reaction torque from reel unit 227.

What is taught in the above about the storage cavity 219, parting interface 224 and sealing tape 222 may be also applied to the reeling cartridge 300. Referring to FIGS. 1, 7, the reeling cartridge 300 may have a peripheral connector 305 that is in communication with the patient connect wire or cable or hose 301 across a well known joint interface 345. The peripheral connector 305 may be positioned on an assembly front face 350 of the patient connect cartridge 300 such that it may be conveniently accessed by a mating connector of a well known patient connect system while the reeling cartridge 300 is snapped in the overall housing 101. The patient connect hub 10 may be consequently easily adapted to different patient connect systems and their particular connector standards by providing the reeling cartridge 300 with a mating peripheral connector 305.

The cartridge housing 321, 323 of the reeling cartridge 300 may be internally sealing the internal reel unit 341, 343, 347 and the joint interface 345 along a reel-spool seal 349 between the reel unit 341, 343, 347 and the internal spool 331. The internal spool 331 may be configured for spooling the patient connect wire or cable or hose 301.

In an embodiment, the internal spool may be removable coupled to the reel unit 341, 343, 347 via coupling members 332 that may be configured in a well known fashion to transfer from the patient connect wire or cable or hose 301 a well known electric or vacuum signal to the joint interface 345 while circumferentially rigidly interlocking with a rotating portion 341 of the reel unit 341, 343, 347 as may be well appreciated by anyone skilled in the art. At the same time, the cartridge housing 321, 323 may be separable in a first housing portion 321 and a second housing portion 323. The first housing portion 321 may separately house the internal reel unit 341, 343, 347, the joint interface 345 and the peripheral connector 305. The second housing portion 323 may separately house the internal spool 331. The two housing portions 321, 323 may join along a parting interface 322 and may be snap connected via well known snapping features 324 and/or held as described above in conjunction with the sealing tape 222.

The second housing portion 323 and the internal spool 331 may, feature cleaning access perforations 334, 326. On spool cleaning of the patient connect wire or cable or hose 301 may be accomplished in case of two separable housing portions 321, 323 by pulling the two housing portions 321, 323 apart after a used patient connect wire or cable or hose 301 is reeled back in and the reeling cartridge 300 removed from the overall housing 101. The second housing portion 323 with the contaminated spooled patient connect wire or cable or hose 301 may be conveniently handled for automated mass cleaning without risk of entanglement of individual patient connect wires and/or cables and/or hoses 301. In case of the employed reel-spool seal 349, the entire reeling cartridge 300 may be put into a cleaning process while the peripheral connector 305 is eventually temporarily plugged.

Figure 11:
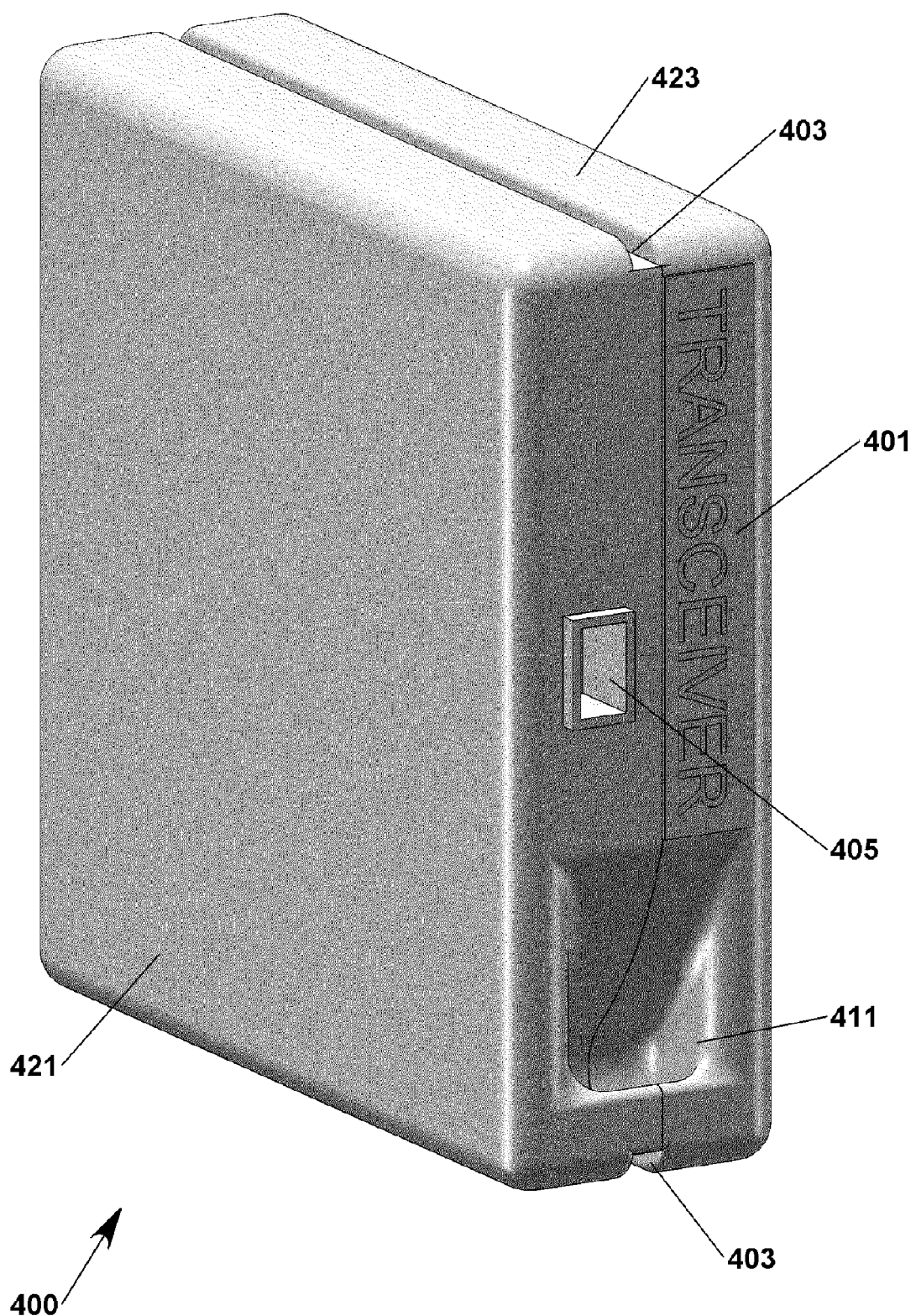
FIG. 11 is the fifth perspective view of a wireless cartridge of FIG. 1.

Also part of the patient connect hub 10 may be wireless cartridge 400 as depicted in FIG. 11. The wireless cartridge 400 may also feature a peripheral connector 405 as described for the reeling cartridge 300. The peripheral connector 405 may be conductively connected to a wireless transceiver module 401 encapsulated in the cartridge housing 423, 433. The wireless transceiver module 401 may be in wireless communication with a well known patient data collecting device attached to a patient as may be well appreciated by anyone skilled in the art. The wireless cartridge 400 may conveniently bridge between conventional wire or cable based patient connect systems and wireless patient data collecting devices.

The patient connect hub 10 may be attached via its mounting bracket 109 to or at a patient bed, patient bedding site, patient operation site, or patient transport vessel. Dependent on the patient's needs a number and combination of unused patient connect cartridges 200, 300 and/or 400 may be inserted into the overall housing 101. Eventual sealing tapes 222 may be ripped off to access the peripheral ends of fluid supply hose(s) 201 and/or patient connect wires or cables or hose(s) 301. Fluid supply hose(s) 201 and/or patient connect wires or cables or hose(s) 301 may be pulled out to the desired length against the reaction force of the coil spring(s) 343 and connected to the patient. Ratchet feature(s) 347 oppose the reaction force once the fluid supply hose(s) 201 and/or patient connect wires or cables or hose(s) 301 are pulled out to the desired length such that the fluid supply hose(s) 201 and/or patient connect wires or cables or hose(s) 301 may be conveniently connected to the patient as is well known in the art.

After the fluid supply hose(s) 201 and/or patient connect wires or cables or hose(s) 301 are disconnected, a small pull releases the ratchet feature 347 in a well known fashion and the contaminated fluid supply hose(s) 201 and/or patient connect wires or cables or hose(s) 301 retract automatically. Through holes 204, 304 and spools 231, 331 are sufficiently wide dimensioned to prevent locking of the contaminated fluid supply hose(s) 201 and/or patient connect wires or cables or hose(s) 301. Especially clogged blood may substantially increase the diameter of fluid supply hose(s) 201 and/or patient connect wires or cables or hose(s) 301.

The fluid supply cartridge 200 may remain connected to the patient until the liquid container 208 is depleted or a predetermined amount of fluid has been supplied as may be visually verified via the frontal view access 215. Once the fluid supply hose 201 is again disconnected, it may be reeled in again and the fluid supply cartridge 200 removed from the overall housing 101. The used fluid supply cartridge 200 may be simply disassembled by separating the removable lid 221, taking out the spin housing 230, unwinding the fluid supply hose 201 from the first spool 231 and removing the liquid container 208 via the open top of the spin housing and the connected fluid supply hose 201 via the radial hose assembly slot 233. In a similar reverse process, a new full liquid container 208 with connected fluid supply hose 201 may be reinserted in the spin housing 230 that may be then again reinserted in the cartridge housing 223 and the removable lid 221 put back on. The closed lid 221 may be sealed again with a new sealing tape 222 after the end of the fluid supply hose 201 is stored in the storage cavity 219. The newly reassembled fluid supply cartridge 200 may then be again ready to be reinserted into the overall housing 101.

Whereas replacement of the fluid supply cartridge 200 may be primarily determined in conjunction with fluid levels in the liquid container 208, replacement of the patient connect cartridge 300 may be determined by hygiene considerations related to contamination of patient connect wires or cables or hose(s) 301. Once a patient connect wire or cable or hose 301 is deemed contaminated, it may be reeled back into the patient connect cartridge 300. Through hole 304 and housing passages are dimensioned with sufficient clearance such that the contaminated patient connect wires or cables or hose(s) 301 may be reeled in substantially unimpeded, which provides for a minimum required reeling torque. As a favorable result, the reeling mechanism 341, 343, 347 may be simply driven by the coil spring 343 in a configuration sufficiently small to be tightly fitted inside the patient connect cartridge 300. The contaminated patient connect cartridge 300 may be hygienically removed from the overall housing 101 since all of the contaminated patient connect wire or cable or hose 301 is spooled out of reach inside the patient connect cartridge 300. At a cleaning location, the patient connect cartridge 300 may be cleaned as a whole in case of an employed reel-spool seal 349. In such case, the peripheral connector 305 may be plugged prior or to cleaning.

In case of a separable patient connect cartridge 300 as described under FIG. 9, the cartridge portion 323 containing the spool 331 may be separated from the cartridge portion 321 containing the reeling mechanism 341, 343, 347 and the peripheral connector 305. The two cartridge portions 321, 323 may be held together be a tape similar the sealing tape 222 and may be separated by merely removing that tape. The separated cartridge portion 323 may be independently cleaned with the spooled patient connect wire or cable or hose 301 and then reassembled again with the other cartridge portion 321.

Accordingly, what is described in the Figures and the Specification above is set forth by the following Claims and their legal equivalent:

What is claimed is:

1. A patient connect hub, comprising:
    a hub housing, comprising:
        a frontal opening;
        a cartridge cavity;
        at least two cartridge positioning guides; and
        at least two cartridge positioning locks;
        wherein said cartridge positioning guides and said cartridge positioning locks are arrayed along a longitudinal direction of said cartridge cavity; and
    a patient connect cartridge comprising:
        a cartridge housing configured to at least partially fit within said cartridge cavity, and
        an internal reel for a fluid supply hose, said internal reel comprising a substantially vertical spool axis such that a liquid may flow through a spooled portion of said fluid supply hose substantially horizontally.

2. The patient connect hub of claim 1, wherein said internal reel further comprises a liquid container positioned above said spooled portion of said fluid supply hose.

3. The patient connect hub of claim 2, wherein said liquid container is connected to a spool end of said fluid supply hose, and is configured to rotate about said spool axis.

4. The patient connect hub of claim 3, wherein said liquid container and said fluid supply hose are configured to be at least partially contained by a spin housing that is configured to rotate about said spool axis.

5. The patient connect hub of claim 4, wherein said spin housing comprises:
    a spool;
    a cup for containing said liquid container; and
    a slot extending along a height of said cup and along a top of said spool such that said fluid supply hose can pass through said.

6. The patient connect hub of claim 2, wherein said cartridge housing further comprises:
    a through hole through which said fluid supply hose can extend; and
    a hose end storage cavity recessed into said cartridge housing for storing a peripheral end of said fluid supply hose outside of said cartridge housing.

7. The patient connect hub of claim 6, further comprising a sealing tape sealing said hose end storage cavity while said peripheral end of said fluid supply hose is contained in said hose end storage cavity.

8. The patient connect hub of claim 7, wherein said cartridge housing further comprises a removable lid that fits together with a remainder of said cartridge housing along a parting line that extends across said through hole such that said liquid container and said fluid supply hose may be inserted into said cartridge housing while said removable lid is removed and such that said peripheral end of said fluid supply hose remains outside said cartridge housing while said removable lid is closed.

9. A patient connect hub, comprising:
    a hub housing, comprising:
        a frontal opening;
        a cartridge cavity;
        at least one cartridge positioning guide; and
        at least one cartridge positioning lock; and
    a patient connect cartridge comprising:
        a cartridge housing configured to at least partially fit within said cartridge cavity,
        a spool;
        an internal reel for spooling a patient connect line on said spool;
        a peripheral connector for coupling a patient connect system to said patient connect line; and
        a seal between said internal reel and said spool.

10. The patient connect hub of claim 9, wherein said patient connect cartridge is at least one of a fluid supply cartridge and a reeling cartridge.

11. The patient connect hub of claim 9, wherein said hub housing further comprises:
    at least two cartridge positioning guides;
    at least two cartridge positioning locks;
    wherein said cartridge positioning guides and said cartridge positioning locks are arrayed along a longitudinal direction of said cartridge cavity; and
    wherein said internal reel unit comprises a spool axis that is substantially parallel respect to said longitudinal direction.

12. The patient connect hub of claim 9, wherein said peripheral connector is positioned on a front face of said patient connect cartridge.

13. The patient connect hub of claim 9, wherein said patient connect cartridge further comprises a reel/spool interface configured to connect said peripheral connector with said patient connect line.

14. The patient connect hub of claim 9, wherein said cartridge housing further comprises:
 a through hole; and
 a removable lid that fits together with a remainder of said cartridge housing along a parting line that extends through said through hole such that said patient connect line may be inserted into said cartridge housing while said removable lid is removed and such that a peripheral end of said patient connect line can remain outside said cartridge housing while said removable lid is closed.

15. The patient connect hub of claim 9, wherein said peripheral connector is positioned on a front face of said patient connect cartridge.

16. A patient connect hub, comprising:
 a hub housing, comprising:
  a frontal opening;
  a cartridge cavity;
  at least two cartridge positioning guides; and
  at least two cartridge positioning locks; and
 a patient connect cartridge comprising:
  a cartridge housing configured to at least partially fit within said cartridge cavity, the cartridge housing including a first housing portion and a second housing portion;
  a spool;
  an internal reel for spooling a patient connect line on said spool; and
  a peripheral connector for coupling a patient connect system to said patient connect line;
 wherein said spool is configured to be removably coupled to the reel unit such that said spool interlocks with a rotating portion of said internal reel; and
 wherein said first housing portion is separable from said second housing portion; and
 wherein said first housing portion separately houses said internal reel, a reel/spool interface, and said peripheral connector, and said second housing portion houses said spool.

17. The patient connect hub of claim 16, wherein said spool and said second housing portion comprise cleaning access perforations.

18. The patient connect hub of claim 16, wherein said peripheral connector is positioned on a front face of said patient connect cartridge.

* * * * *

UNITED STATES PATENT AND TRADEMARK OFFICE
CERTIFICATE OF CORRECTION

| | | |
|---|---|---|
| PATENT NO. | : 8,151,820 B1 | Page 1 of 1 |
| APPLICATION NO. | : 12/125145 | |
| DATED | : April 10, 2012 | |
| INVENTOR(S) | : Kevin B. Larkin | |

It is certified that error appears in the above-identified patent and that said Letters Patent is hereby corrected as shown below:

In the Claims, Column 8, Line 18, after the word said, insert --slot in said first spool while said liquid container is assembled in said cup--

In the Claims, Column 8, Line 66, delete "respect"

Signed and Sealed this
Tenth Day of July, 2012

David J. Kappos
*Director of the United States Patent and Trademark Office*